Figure 1:
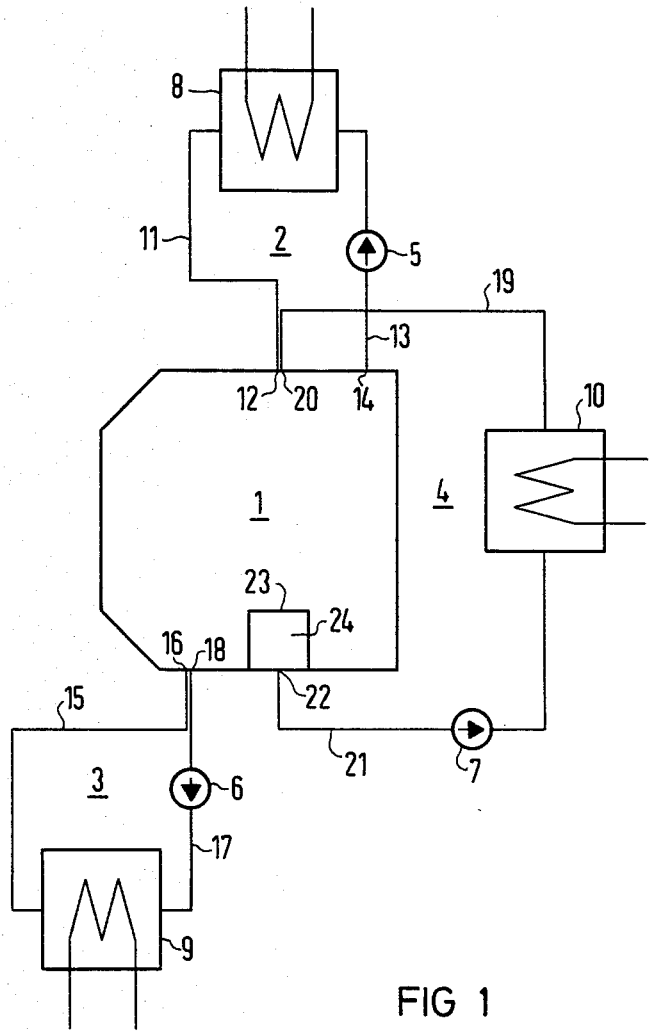

United States Patent [19]

Schneider

[11] Patent Number: 4,534,931
[45] Date of Patent: Aug. 13, 1985

[54] INSTALLATION FOR COOLING A FUEL ELEMENT STORAGE WELL WITH SEVERAL WATER CIRCUITS

[75] Inventor: Wilfried Schneider, Grosskrotzenburg, Fed. Rep. of Germany

[73] Assignee: Siemens Aktiengesellschaft, Berlin and Munich, Fed. Rep. of Germany

[21] Appl. No.: 633,078

[22] Filed: Jul. 23, 1984

Related U.S. Application Data

[63] Continuation of Ser. No. 379,572, May 18, 1982, abandoned.

[30] Foreign Application Priority Data

May 20, 1981 [DE] Fed. Rep. of Germany ....... 3120106

[51] Int. Cl.³ .............................................. G21C 19/08
[52] U.S. Cl. ..................................... 376/272; 376/298
[58] Field of Search ............... 376/272, 298, 299, 281, 376/282, 283, 404, 405; 250/506.1, 507.1

[56] References Cited

U.S. PATENT DOCUMENTS

| | | | |
|---|---|---|---|
| 3,133,197 | 5/1964 | Allen | 250/506.1 |
| 3,188,277 | 6/1965 | Kornbichler et al. | 376/282 X |
| 3,966,548 | 6/1976 | Müller et al. | |
| 4,033,814 | 7/1977 | Bregeon et al. | 376/404 X |
| 4,318,492 | 3/1982 | Peehs et al. | 376/272 X |
| 4,367,194 | 1/1983 | Schenewerk et al. | 376/282 |

Primary Examiner—Deborah L. Kyle
Assistant Examiner—Dan Wasil
Attorney, Agent, or Firm—Herbert L. Lerner; Laurence A. Greenberg

[57] ABSTRACT

Installation for cooling a water-filled fuel element storage well, including a plurality of cooling circuits having drain lines with connections to the well, pumps connected to the drain lines, heat exchangers connected to the pumps and feed lines being connected to the heat exchangers and having connections to the well, one of the connections of the drain lines to the well being disposed at a level which is at least as high as the other of the drain line and feed line connections, and a downwardly directed pipe disposed in the storage well being connected to the one of the drain line connections and having a lower opening formed therein at a lower level than the drain line and feed line connections.

4 Claims, 3 Drawing Figures

INSTALLATION FOR COOLING A FUEL ELEMENT STORAGE WELL WITH SEVERAL WATER CIRCUITS

This application is a continuation of application Ser. No. 379,572, filed May 18, 1982 now abandoned.

The invention relates to an installation for cooling a water-filled fuel element storage well with the aid of several cooling circuits, having drain lines which begin at the well and lead through pumps to heat exchangers and having feed lines that connect the heat exchangers with the storage well.

In general, a storage well is provided for storing the fuel elements of a pressurized water reactor. Since it is necessary to carry away the heat generated by the radioactive decay, feed and drain lines for the cooling water must be connected to the storage well.

It is known in the art from German Published, Prosecuted Application DE-AS No. 22 07 870 to install an additional, separate well-cooling circuit for the cooling of a fuel element storage well, besides the conventional two internal cooling circuits in connection with the cooling circuits of the reactor. It is further known from the corresponding German Published, Non-Prosecuted Application DE-OS No. 22 07 870 to install the feed and drain lines of the cooling circuits at such a depth below the undisturbed water level of the storage well, that the water remaining in the well still covers the fuel elements completely after a leak has occured in one of the pipe lines.

If a leak develops in a cooling line, the water runs out from the storage well down to its connection with the well and makes any further cooling water circulation impossible, assuming the leak occurs at the lowest connection in the well. This is because there is no water left to be sucked away. However, further cooling of the storage well must be guaranteed at all times.

It is accordingly an object of the invention to provide an installation for cooling a fuel element storage well with several water circuits, which overcomes the hereinafore-mentioned disadvantages of the heretofore-known devices of this general type, and to continue the cooling of the fuel element storage well in the above-mentioned way after a leak has occured in any of the feed or drain lines, by sucking the water out and feed it back again after it has run through a heat exchanger.

With the foregoing and other objects in view there is provided, an installation for cooling a water-filled fuel element storage well, comprising a plurality of cooling circuits having drain lines with connections to the well, pumps connected to said drain lines, heat exchangers connected to said pumps and feed lines being connected to said heat exchangers and having connections to the well, one of said cooling circuits having its connections of its feed line and drain line to the well being disposed at a level which is higher than the others of said drain line and feed line connections, and a downwardly directed pipe disposed in said storage well being connected to the drain line connection of said one cooling circuit and having a lower opening formed therein at a lower level than all of said drain line and feed line connections.

If a leak should occur in this drain line, the water in the well will first empty down to the bottom inlet opening of the downwardly directed pipe due to siphon action. However, thereafter, water will be fed in through the still functioning feed lines, until the water level rises above the feed and drain connections of the other cooling circuits, and these again take over the continued cooling of the storage well. In this way, the water does not reach the connection of the defective drain line, because it lies at a higher level than all of the other connections.

If a leak occurs at a feed line or at one of the drain lines which is not provided with a downwardly pointing pipe, the water runs out down to the level of the connection of the defective pipe line. However, in this case, water can still be sucked out through the downwardly directed pipe provided according to the invention and the drain line connected therewith, because the lower opening of this pipe lies below the level at which all other pipes are connected. Thus, the cooling circuit with the provision according to the invention continues to be operative.

If one of the feed lines has a deflection tube to generate a directed flow of the cooling water, it is possible that if a leak develops in this line, the water level in the storage well will drop below its connection point at the well due to siphoning action. This is prevented if in accordance with another feature of the invention, there are provided downwardly directed deflection pipes connected to the drain line and feed line connections, the deflection pipes having vertical slots formed therein.

No mechanical devices are required to obtain the advantages of maintaining the cooling capability, the failure of which would otherwise occur.

If dirt collects on the upper surface of the water in the fuel element storage well, it can be removed by the provision of the drain line of one cooling circuit sucking the water off the upper surface. To achieve this, in accordance with a further feature of the invention, there is provided another pipe, the first-mentioned pipe having an opening formed therein at a lower level that the drain line and feed line connections, the opening being in communication with the other pipe, the other pipe having a termination directly below the surface of water disposed in the well and being formed with an upwardly directed opening and a horizontal edge at the termination.

In accordance with a concomitant feature of the invention, the horizontal edge is movable vertically. The horizontal edge can be moved vertically by mechanical means, and thereby follows the water level, so that only dirt carrying water from the surface is sucked off by the additional pipe. Since the two pipes are connected with each other at a point which is lower in the storage well than all of the other pipe connections, in this manner the advantages explained above in case of a leak in a feed or drain line, remain unchanged.

Other features which are considered as characteristic for the invention are set forth in the appended claims.

Although the invention is illustrated and described herein as embodied in an installation for cooling a fuel element storage well with several water circuits, it is nevertheless not intended to be limited to the details shown, since various modifications and structural changes may be made therein without departing from the spirit of the invention and within the scope and range of equivalents of the claims.

Figure 2:
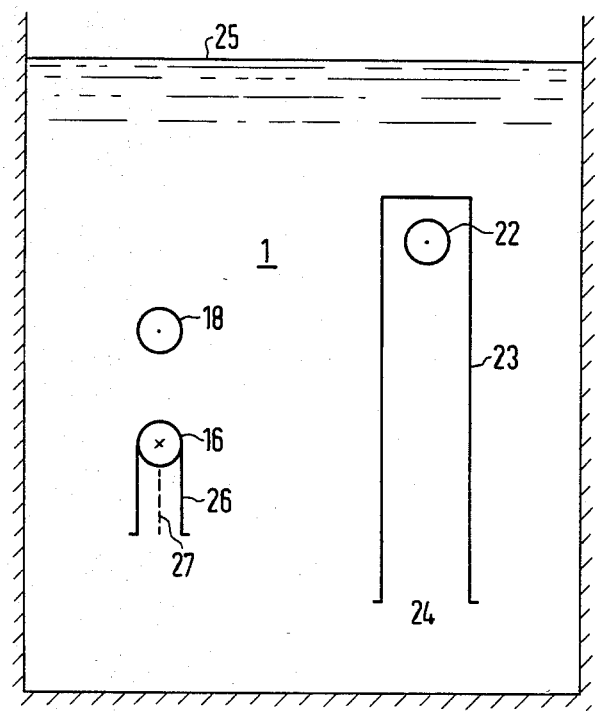
Figure 3:
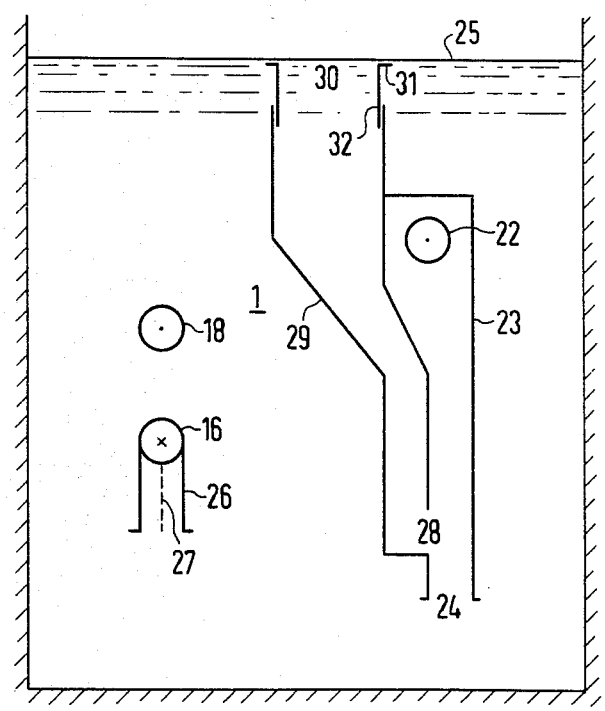

The construction and method of operation of the invention, however, together with additional objects and advantages thereof, will be best understood from the following description of specific embodiments when read in connection with the accompanying drawings, in which:

FIG. 1 is a diagrammatic and schematic circuit diagram of the cooling circuits for a storage well according to the invention; and FIGS. 2 and 3 are diagrammatic side-elevational views of two embodiments of the storage wells.

Referring now to the figures of the drawing and first particularly to FIG. 1 thereof, there is seen a cross section of a fuel element storage well 1 which is part of a pressurized water reactor plant and is cooled by cooling circuits 2, 3 and 4, which conduct the water in the well by means of pumps 5, 6 and 7 through heat exchangers 8, 9 and 10 and then conduct it again to the storage well 1.

The cooling circuit 2 feeds the cooling water into the storage well 1 through a line 11 with a connection 12, which is located at a depth of 2.15 m, so that an undisturbed water surface 25 in the storage well 1, shown in FIGS. 2 and 3, is the reference level. The connection 12 lies 1.15 m vertically below a connection 20 of a feed line 19. A drain line 13 of the cooling circuit 2 is installed at a connection 14 at a depth of 1.55 m. A connection 16 of a feed line 15 and a connection 18 of a drain line 17 of the cooling circuit 3 are disposed at corresponding depth vertically on top of each other.

The cooling water of the cooling circuit 4 is fed into a storage well through the line 19 with the connection 20 at a depth of 1.00 m, it thereafter flows through a pipe 23 vertically disposed in the storage well 1, and is drained through a line 21 having a connection 22 which is located at the same depth at the diametrically opposite side. An inlet 24 of the pipe 23 is positioned at a depth of 3 m.

FIG. 2 shows a side-elevational view of the fuel element storage well 1 filled with water. At the side shown in the drawing, the feed line 15 of the cooling circuit 3 terminates at the connection 16 which is 2.15 m below the water surface 25; this feed line 15 being provided with a deflection pipe 26. The deflection pipe 26 has a vertical slot 27 formed therein. The drain line 17 of the abovementioned circuit 3 begins at the connection 18 which is 0.60 m above the connection 16 for the feed line 15.

The cooling circuit 4 feeds water into the fuel element storage well 1 at a non-illustrated opposite side, through the line 19 at the connection 20 which is 1.00 m below the water surface 25.

The associated discharge means include a downwardly directed pipe 23 which is disposed inside the storage well 1, and which is provided with an opening 24 at a depth of 3.00 m. The pipe 23 terminates into the drain line 21 at the connection 22 at a depth of 1.00 m.

FIG. 3 shows a side-elevational view of a different construction of the water-filled fuel element storage well 1. The downwardly directed pipe 23 in the storage well 1 which terminates at the connection 22 into the drain line 21 of cooling circuit 4, is connected to a second pipe 29 through an opening 28. This pipe 29 extends upward directly below the water surface 25, and has an opening 30 there which is directed upward and has a horizontal edge 31. The upper part 32 of the pipe 29 can be moved vertically.

The foregoing is a description corresponding to German Application P No. 31 20 106.7, dated May 20, 1981, the International priority of which is being claimed for the instant application, and which is hereby made part of this application. Any discrepancies between the foregoing specification and the aforementioned corresponding German application are to be resolved in favor of the latter.

I claim:

1. Installation for cooling fuel elements, comprising a water-filled open-top fuel element storage well, a plurality of separate water-filled cooling circuits having drain lines with connections to the well, pumps connected to said drain lines, heat exchangers connected to said pumps and feed lines being connected to said heat exchangers and having connections to the well, one of said cooling circuits having its connections of its feed line and drain line to the well being disposed at a level which is higher than the others of said drain line and feed line connections, and a downwardly directed pipe disposed in said storage well being connected to the drain line connection of said one cooling circuit and having a lower opening formed therein at a lower level than all of said drain line and feed line connections.

2. Installation according to claim 1, including another pipe, said first-mentioned pipe having an opening formed therein at a lower level than said drain line and feed line connections, said opening being in communication with said other pipe, said other pipe having a termination directly below the surface of water disposed in the well and being formed with an upwardly directed opening and a horizontal edge at said termination.

3. Installation according to claim 2, wherein said horizontal edge is movable vertically.

4. Installation according to claim 1, 2 or 3, including downwardly directed deflection pipes connected to said drain line and feed line connections, said deflection pipes having vertical slots formed therein.

* * * * *